UNITED STATES PATENT OFFICE.

FERDINAND GEORGE, OF BRUSSELS, BELGIUM.

SOLDERING OF ALUMINIUM.

SPECIFICATION forming part of Letters Patent No. 597,971, dated January 25, 1898.

Application filed November 8, 1897. Serial No. 657,877. (No specimens.) Patented in Belgium March 31, 1897, No. 127,055, and July 15, 1897, No. 129,242.

*To all whom it may concern:*

Be it known that I, FERDINAND GEORGE, a citizen of the Kingdom of Belgium, residing at Brussels, Belgium, have invented certain new and useful Improvements in the Soldering of Aluminium, (for which patents have been granted in Belgium, No. 127,055, dated March 31, 1897, and No. 129,242, dated July 15, 1897;) and I do hereby declare the following to be a full, clear, and exact description of the invention, such as will enable others skilled in the art to which it appertains to make and use the same.

This invention relates to the soldering of aluminium by means of aluminium itself, employed in a pure state without alloy.

In soldering aluminium according to this invention I proceed in the following manner:

I prepare a bath consisting of one part of sea-salt (chlorid of sodium) and two parts of essence of turpentine or of any other hydrocarbid, whether isomeric or not, and in this latter case I modify the proportions in such a manner as to always obtain the same quantity of carbon combined in contact with the chlorid of sodium. I heat the parts to be soldered to a dull red and then temper them in the bath described above. The object of this tempering is to modify the molecular condition of the metal and to prepare it to receive the solder. After such tempering the parts to be soldered are lightly powdered with borax, and aluminium in a state of fusion is interposed. After cooling, the parts are perfectly soldered.

Having now particularly described and ascertained the nature of my said invention and in what manner the same is to be performed, I declare that what I claim is—

1. The process of soldering with unalloyed aluminium parts made of the same metal, which consists in modifying the molecular condition of the parts to be soldered together so as to cause the melted aluminium to adhere thereto by subjecting such parts to the action of heat and while hot to the action of a reagent.

2. In the process of soldering with unalloyed aluminium parts made of the same metal, heating the parts to a red heat and then plunging the same into a bath of sodium chlorid and a hydrocarbid.

3. The process of soldering with unalloyed aluminium parts made of the same metal, which consists in heating the parts to a red heat and then plunging the same into a bath composed of about one part of sodium chlorid and of about two parts of a hydrocarbid, substantially as set forth.

In testimony whereof I affix my signature in presence of two witnesses.

FERDINAND GEORGE.

Witnesses:
 HENRI DE SMET,
 CÉLESTIN VÉRTOMMEN.